No. 815,900. PATENTED MAR. 20, 1906.
D. O. BRACKETT.
TIRE SHRINKING MACHINE.
APPLICATION FILED AUG. 20, 1904.

2 SHEETS—SHEET 1.

Witnesses
C. H. Walker
K. P. Clarke

Inventor
Don O. Brackett
by James W. Bevans
his Attorney

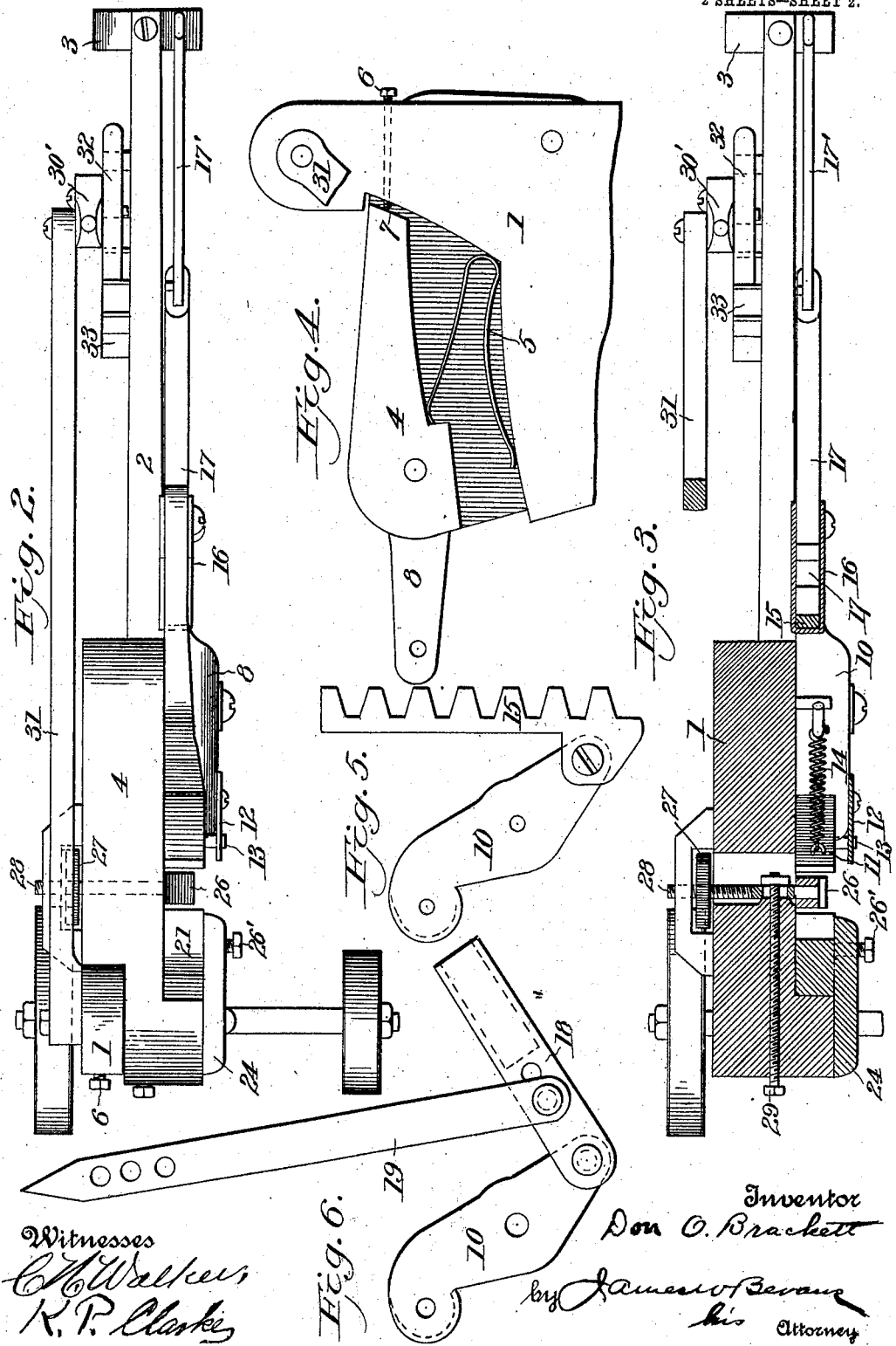

UNITED STATES PATENT OFFICE.

DON O. BRACKETT, OF FOREST CITY, NORTH CAROLINA.

TIRE-SHRINKING MACHINE.

No. 815,900.        Specification of Letters Patent.        Patented March 20, 1906.

Application filed August 20, 1904. Serial No. 221,485.

*To all whom it may concern:*

Be it known that I, DON O. BRACKETT, a citizen of the United States, residing at Forest City, in the county of Rutherford and State of North Carolina, have invented new and useful Improvements in Tire-Shrinking Machines, of which the following is a specification.

This invention relates to improvements in tire-shrinking machines; and the object is to provide a simple, convenient, and effective machine by means of which tires may be fitted to the wheels of buggies, wagons, and other vehicles without removing the wheel from the axle or the tire from the wheel.

With the above object in view the invention consists in the novel features of construction hereinafter fully described, particularly pointed out in the claims, and clearly illustrated by the accompanying drawings, in which—

Figure 1:
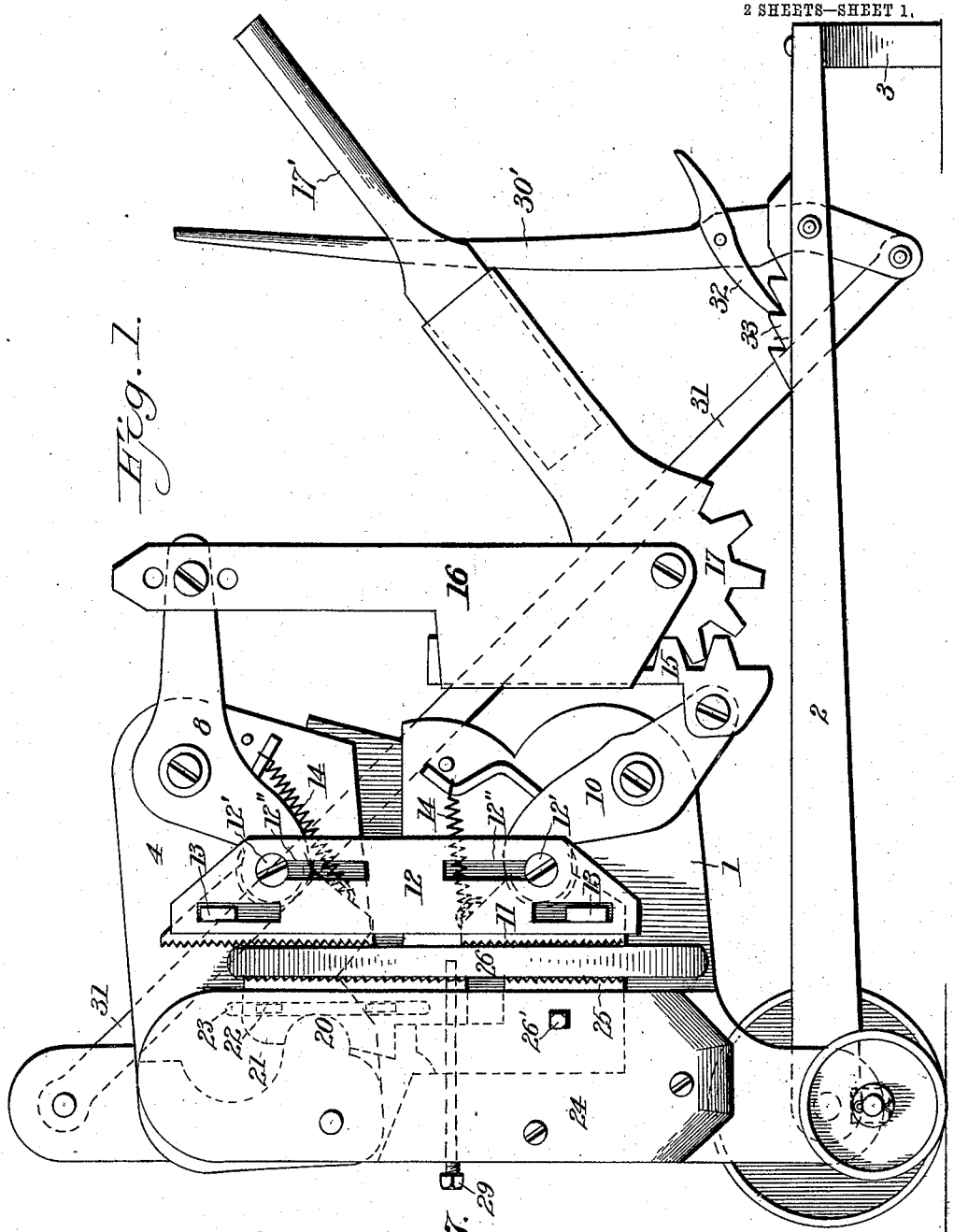
Figure 2:
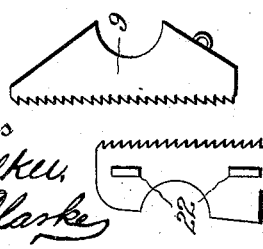

Figure 1 is a side elevation of a machine constructed in accordance with my invention; Fig. 2, a top plan view of the same; Fig. 3, a similar view, partly in section; Fig. 4, a detail view of the swinging arm looking at the same from the rear side of the machine; Fig. 5, a detail view of one of the grip-operating levers and the rack carried thereby; Fig. 6, a detail view of a lever attachment for operating the grips, and Fig. 7 a detail view of the upper pair of grips.

Referring now more particularly to the accompanying drawings, 1 designates the vertical support of the machine, pivotally attached at its lower end to a horizontally-extending bar 2, which bar is provided at one end with an axle and suitable wheels, whereby the machine may be conveniently moved from place to place for use. The other end of the bar is supported by a block 3, attached to the under side thereof. Instead of mounting the machine upon wheels it could be attached to a fixed support, if desired.

Pivotally attached to the upper portion of the vertical support 1 is a horizontally-extending swinging arm 4, returned to its normal position after being depressed by a suitable spring 5. This arm is limited in its downward movement by an adjustable stop 6, extending through the support 1 and engaged by a shoulder 7, formed on the arm near its pivotal point. Pivotally mounted at the outer end of the swinging arm is an intermediately-pivoted lever 8, to the inner end of which a grip 9 is pivoted, the end of the lever being rounded to fit in a socket formed in the grip, as shown in Fig. 7. Pivoted to the outer end of a horizontal extension from the vertical support is a similar lever 10, arranged reversely to lever 8 and carrying a grip 11, pivotally attached similarly to grip 9. Connecting these levers 8 and 10 is a plate or link 12, slotted near its respective ends to receive projections 13, extending laterally from grips 9 and 11 near their outer ends. This plate is attached by screws 12', passing through slots 12'', formed therein and entering levers 8 and 10. Coiled springs 14 are attached to the inner ends of the grips and the levers for the purpose of holding the former firmly against the latter. Pivotally attached to the outer end of lever 10 is a rack-bar 15, movable in a slotted lever 16, adjustably connected at its upper end to the outer end of lever 8 and carrying at its lower end a pivoted segment 17, meshing with the rack and to which a suitable operating handle or lever 17' is attached or formed integral therewith. Instead of the lever 16 and rack-bar 15 a lever 18, connected to lever 10 by a link 19, could be used.

The swinging arm 4 is formed on one side at a point intermediately of its pivotal point and outer end with a curved projection 20, entering a socket formed in a grip 21, arranged substantially opposite to grip 9, said grip having projections 22, entering and moving in a groove 23, formed in the inner side of a plate 24, secured to the vertical support 1. Arranged below grip 21 is a grip 25, positioned opposite to grip 11 and held from movement by a set-screw or other securing means 26', passing through the plate 24 and an overlapping portion of grip 21. Arranged vertically between the two sets of grips is a gage 26, which is concaved to correspond with the contour of the wheel containing the tire which is placed thereagainst. This gage may be adjusted according to the thickness of tire by an adjusting-disk 27 on a threaded stem 28, carried by the gage and locked in its adjustment by a set-screw 29. Said gage is narrower than the tire, so that the grips engage the edges of the latter and do not clamp the gage.

Pivotally attached intermediately of its ends to the bar 2 is a hand-lever 30', to the lower end of which a link 31 is pivoted, the opposite end of the link being pivotally attached to the upper end of vertical support or upright 1. The lever has a pawl 32, engaging the teeth of a rack 33, attached to the bar 2.

By means of this structure the machine may be tilted on the bar 2 and held in its adjustment to conveniently operate upon the tire.

The operation of my machine is as follows: The gage having been adjusted according to the thickness of the tire, the wheel is held thereagainst, with the tire thereon, and lever 17' operated to depress the swinging arm. This movement of the swinging arm causes grips 9 and 11 to engage the edge of the tire and force the latter against grips 21 and 25. A further movement of the arm effects a downward movement of grips 9 and 21, while grips 11 and 25 tightly grip the tire, with the result that any looseness in the tire will be taken up, and it will be fitted tightly to the rim of the wheel.

I do not limit my invention to the exact details here shown and described, as many modifications may be made therein without departing from the spirit and scope of my invention.

Having thus fully described my invention, what I claim as new, and desire to secure by Letters Patent of the United States, is—

1. A machine of the character described, comprising a support, a swinging arm pivoted thereto, intermediately-pivoted levers mounted one upon the free end of said arm and the other upon the support, grips pivotally attached to the inner ends of said levers, a stationary grip carried by the support and disposed opposite to one of said pivoted grips, a sliding grip mounted upon said support and disposed opposite to the other of said pivoted grips, an operative connection between said sliding grip and the swinging arm, and means connected with the outer ends of said intermediately-pivoted levers for effecting the movement of the pivoted grips and swinging arm.

2. A machine of the character described, comprising a support, a swinging arm pivoted thereto, intermediately-pivoted levers mounted one upon the free end of said arm and the other upon the support, grips pivotally attached to the inner ends of said levers, a stationary grip carried by the support and disposed opposite to one of said pivoted grips, a sliding grip mounted upon said support and disposed opposite to the other of said pivoted grips, an operative connection between said sliding grip and the swinging arm, means connected with the outer ends of said intermediately-pivoted levers for effecting the movement of the pivoted grips and swinging arm, and a gage arranged between the pairs of grips against which the tire is placed.

3. A machine of the character described comprising a support, a swinging arm carried thereby, intermediately-pivoted levers mounted one on the free end of said arm and the other upon the support, grips pivotally attached to the inner ends of said levers, an operative connection between said grips, a sliding grip carried by the support and disposed opposite to one of the pivoted grips, a stationary grip carried by the support and disposed opposite to the other of said pivoted grips, an operative connection between said sliding grip and the swinging arm, and means connected with the outer ends of said intermediately-pivoted levers for effecting the movement of the pivoted grips and swinging arm.

4. A machine of the character described comprising a support, a swinging arm carried thereby, intermediately-pivoted levers mounted one on the free end of said arm and the other upon the support, grips pivotally attached to the inner ends of said levers, a plate having a sliding and pivotal connection with said levers and a sliding connection with the grips, a sliding grip mounted on the support and disposed opposite to one of said pivoted grips, a stationary grip carried by the support and disposed opposite to the other of said pivoted grips, an operative connection between said sliding grip and the swinging arm, and means connected with the outer ends of said intermediately-pivoted levers for effecting the movement of the pivoted grips and swinging arm.

5. A machine of the character described comprising a support, a swinging arm carried thereby, intermediately-pivoted levers mounted one on the free end of said arm, and the other upon the support, grips pivotally attached to the inner ends of said levers, a plate having a sliding and pivotal connection with said levers and provided with slots, a sliding grip mounted on the support and disposed opposite to one of said pivoted grips, projections carried by the grips working in said slots, a stationary grip carried by the support and disposed opposite to the other of said pivoted grips, an operative connection between said sliding grip and the swinging arm, and means connected with the outer ends of said intermediately-pivoted levers for effecting the movement of the pivoted grips and swinging arm.

In testimony whereof I affix my signature in the presence of two witnesses.

DON O. BRACKETT.

Witnesses:
W. W. HICKS,
G. W. ROLLINS